(12) United States Patent
Yerramalli et al.

(10) Patent No.: US 11,395,154 B2
(45) Date of Patent: Jul. 19, 2022

(54) METHODS AND APPARATUSES FOR DETERMINING SENSING BEAM FOR AN LBT PROCURE

(71) Applicant: QUALCOMM Incorporated, San Diego, CA (US)

(72) Inventors: Srinivas Yerramalli, San Diego, CA (US); Arumugam Chendamarai Kannan, San Diego, CA (US); Vinay Chande, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/850,205

(22) Filed: Apr. 16, 2020

(65) Prior Publication Data

US 2020/0336921 A1 Oct. 22, 2020

Related U.S. Application Data

(60) Provisional application No. 62/835,877, filed on Apr. 18, 2019.

(51) Int. Cl.
*H04W 16/28* (2009.01)
*H04W 16/14* (2009.01)
(Continued)

(52) U.S. Cl.
CPC ............ *H04W 16/28* (2013.01); *H04W 16/14* (2013.01); *H04W 72/046* (2013.01); *H04W 74/0808* (2013.01)

(58) Field of Classification Search
CPC . H04W 16/28; H04W 16/14; H04W 74/0808; H04W 72/046; H04B 7/0695
See application file for complete search history.

(56) References Cited

U.S. PATENT DOCUMENTS 10,880,894 B2\* 12/2020 Xia .................... H04B 7/0617
10,912,128 B2\* 2/2021 Li .......................... H04W 88/08
(Continued)

FOREIGN PATENT DOCUMENTS

CN 107919929 A 4/2018
WO 2018059512 A1 4/2018
(Continued)

OTHER PUBLICATIONS

International Search Report and Written Opinion—PCT/US2020/028803—ISA/EPO—dated Jul. 1, 2020.

*Primary Examiner* — Ivan O Latorre
(74) *Attorney, Agent, or Firm* — Seyfarth Shaw LLP

(57) ABSTRACT

For unlicensed high-frequency bands such as mmW bands as used in 5G NR communications, either by regulation or for coexistence with licensed frequency bands, there may be a need for a contention-based access procedure such as the LBT procedure. A challenge is to find a suitable sensing beam to functions as a proxy for a set of transmission beams. In an aspect of the disclosure, a method and an apparatus are provided. The apparatus is configured to determine a set of transmission beams for a transmission opportunity, determine a sensing beam for the set of transmission beams based on a set of beam sensing criteria; and initiate an LBT procedure by sensing an energy on the determined sensing beam. The apparatus may then use the LBT procedure to obtain the access to and transmit data on the determined set of transmission beams.

30 Claims, 10 Drawing Sheets

(51) Int. Cl.
*H04W 74/08* (2009.01)
*H04W 72/04* (2009.01)

(56) References Cited

U.S. PATENT DOCUMENTS

| | | | | |
|---|---|---|---|---|
| 2006/0211439 | A1* | 9/2006 | Mizuguchi | H04W 52/42 |
| | | | | 455/522 |
| 2007/0249402 | A1* | 10/2007 | Dong | H04W 16/28 |
| | | | | 455/562.1 |
| 2011/0128948 | A1* | 6/2011 | Jeon | H04W 74/002 |
| | | | | 370/338 |
| 2011/0211490 | A1* | 9/2011 | Nikula | H04B 7/086 |
| | | | | 370/252 |
| 2016/0037560 | A1* | 2/2016 | Liu | H04B 7/0695 |
| | | | | 370/329 |
| 2016/0345345 | A1* | 11/2016 | Malik | H04W 24/10 |
| 2017/0223744 | A1* | 8/2017 | Qian | H04W 74/0833 |
| 2019/0200389 | A1* | 6/2019 | Li | H04W 72/1231 |
| 2019/0230706 | A1* | 7/2019 | Li | H04W 74/0808 |
| 2019/0268939 | A1* | 8/2019 | Yang | H04W 74/08 |
| 2019/0335511 | A1* | 10/2019 | Liu | H04W 52/48 |
| 2019/0373635 | A1* | 12/2019 | Yang | H04B 7/0408 |
| 2020/0045715 | A1* | 2/2020 | Li | H04W 72/1263 |
| 2020/0112347 | A1* | 4/2020 | Fukui | H04W 16/28 |
| 2020/0314906 | A1* | 10/2020 | Goyal | H04B 7/0695 |
| 2020/0374932 | A1* | 11/2020 | Chen | H04W 72/046 |
| 2021/0028847 | A1* | 1/2021 | Bedekar | H04L 5/0023 |
| 2021/0058967 | A1* | 2/2021 | Oteri | H04W 16/14 |

FOREIGN PATENT DOCUMENTS

| | | | | |
|---|---|---|---|---|
| WO | 2018219236 | A1 | 12/2018 | |
| WO | WO-2019210185 | A1 * | 10/2019 | H04B 7/0695 |

* cited by examiner

METHODS AND APPARATUSES FOR DETERMINING SENSING BEAM FOR AN LBT PROCURE

CROSS-REFERENCE TO RELATED APPLICATION

This application claims the benefit of U.S. Provisional Application Ser. No. 62/835,877, entitled "METHODS AND APPARATUSES FOR DETERMINING SENSING BEAM FOR AN LBT PROCURE", filed on Apr. 18, 2019, the entire content of which is expressly incorporated by reference herein in its entirety.

BACKGROUND

Field

The present disclosure relates generally to communication systems, and more particularly, to a method and apparatus for determining a sensing beam for directional listen-before-talk (LBT) with mismatched Rx and Tx beams.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For unlicensed frequency bands, by regulation and for coexistence with other devices operating in the same frequency band, there may be a need for a contention-based access procedure. LBT is a common contention-based access procedure often used in unlicensed wireless networks such as Wi-Fi/(Licensed-Assisted Access) (LAA)/NR in unlicensed spectrum (NR-U) network. As part of the LBT procedure, a transmitting entity may first sense or check the transmission medium or channel, to ascertain whether the transmission medium is available for transmission. Furthermore, the transmitting entity may also request a confirmation from a receiver to determine whether the receiver is ready to receive the transmission with a sufficiently high quality. For unlicensed high-frequency bands such as millimeter wave frequency bands, as used in 5G, a transmission medium to be used for channel sensing is a directional beam generated from an antenna array. Since a device may use multiple beams for transmission within a transmission opportunity (either in a TDM (Time Division Multiplexing), FDM (Frequency Division Multiplexing) or SDM (Space Division Multiplexing) fashion), the channel access/LBT mechanism may determine whether each of the beams is available for transmission. In such a scenario, a beam pattern used for channel sensing may not be the same as the beam for directional transmission at any given point of time.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

For unlicensed frequency bands, by regulation and for coexistence with other devices operating in the same frequency band, there may be a need for a contention-based access procedure. LBT is a common contention-based access procedure often used in unlicensed wireless networks such as Wi-Fi/(Licensed-Assisted Access) (LAA)/NR in unlicensed spectrum (NR-U) network. As part of the LBT procedure, a transmitting entity may first sense or check the transmission medium or channel, to ascertain whether the transmission medium is available for transmission. Furthermore, the transmission entity may also request a confirmation from a receiver to determine whether the receiver is ready to receive the transmission with a sufficiently high quality. For unlicensed high-frequency bands such as millimeter wave frequency bands, as used in 5G, a transmission medium to be used for channel sensing is a directional beam generated from an antenna array. Since a device may use multiple beams for transmission within a transmission opportunity (either in a TDM, FDM or SDM fashion), the channel access/LBT mechanism has to determine whether each of the beams is available for transmission. In such a scenario, a beam pattern used for channel sensing may not be the same as the beam for directional transmission at any given point of time. Thus, there is a need to find a beam for channel sensing that can be used as a proxy for all the transmissions within a transmission opportunity (TxOP).

In an aspect of the disclosure, a method, a computer-readable medium, and an apparatus are provided. The apparatus are configured to determine a set of transmission beams for a TxOP, determine a sensing beam for the set of transmission beams based on a set of beam sensing criteria; and initiate a listen before talk (LBT) procedure by sensing an energy on the determined sensing beam. Once it is determined that the sensing beam is available, indicating that the set of transmission beams is available, the apparatus may use the LBT procedure to obtain the access to the determined set of transmission beams. The apparatus may be a 5G network node, a UE with a large number of antenna elements, or a peer network node.

To the accomplishment of the foregoing and related ends, the one or more aspects comprise the features hereinafter fully described and particularly pointed out in the claims.

The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
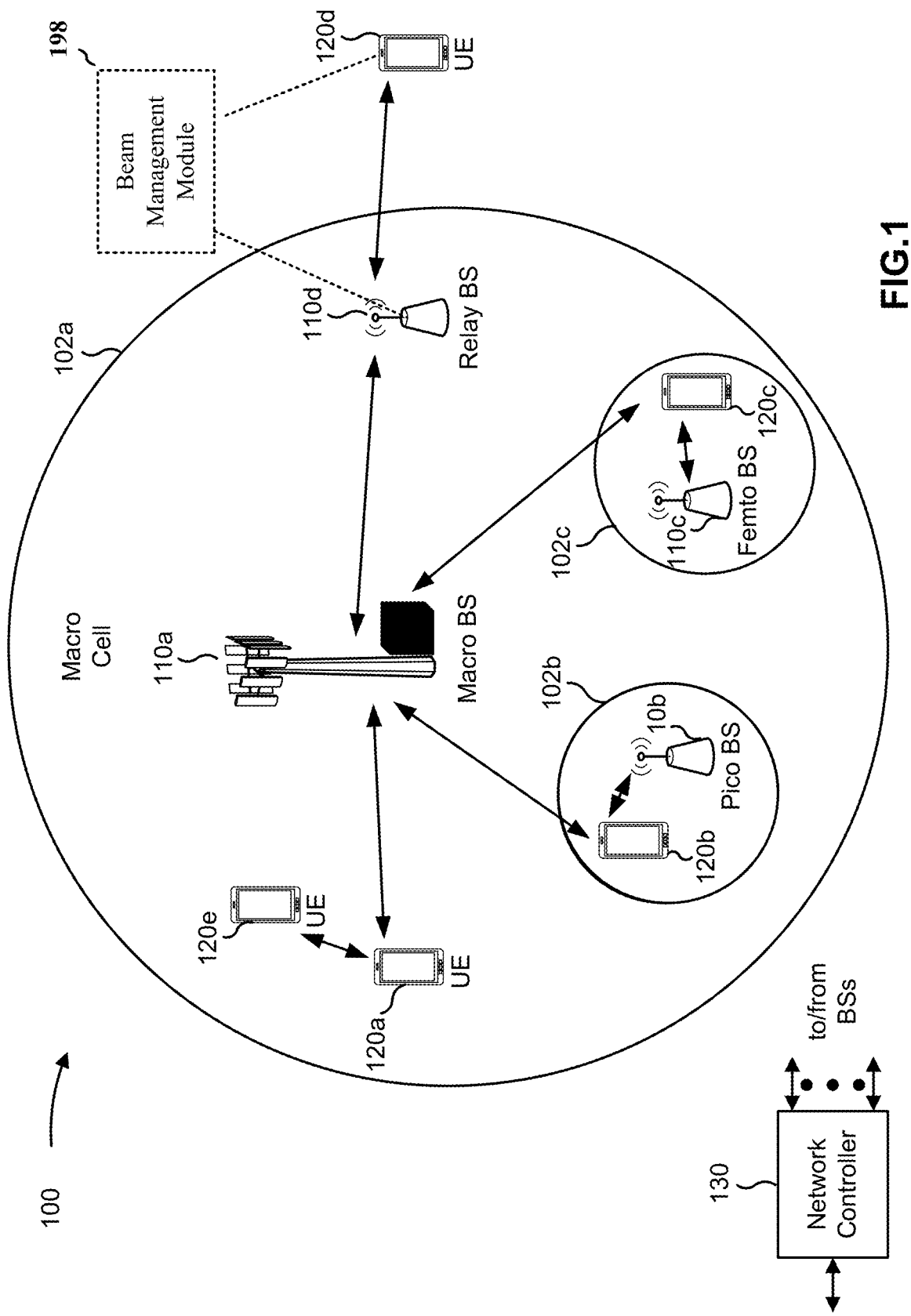
FIG. 1 is a diagram illustrating an example of a wireless communications system and an access network in accordance with aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110. For example, the UE 120 may transmit control-data transmissions during control-data resources, and may transmit feedback messages as responses to control-data transmissions during feedback resources. In this case, the feedback resources may be periodic system-wide feedback resources with a many-to-one mapping to the control-data resources as described in more detail herein. For example, the feedback resources may be pre-determined or pre-configured, such that UEs in a network may determine and/or may have stored information identifying the feedback resources, which are to be shared among a plurality of UEs.

Referring again to FIG. 1, in certain aspects, the UE 120d and/or base station 110d may be configured with a beam management module 198. The beam management module 198 may be configured to determine a set of transmission beams, and a suitable sensing beam for the set of transmission beam, and initiate an LBT procedure using the determined suitable sensing beam.

As indicated above, FIG. 1 is provided merely as an example. Other examples may differ from what was described with regard to FIG. 1.

Figure 2:
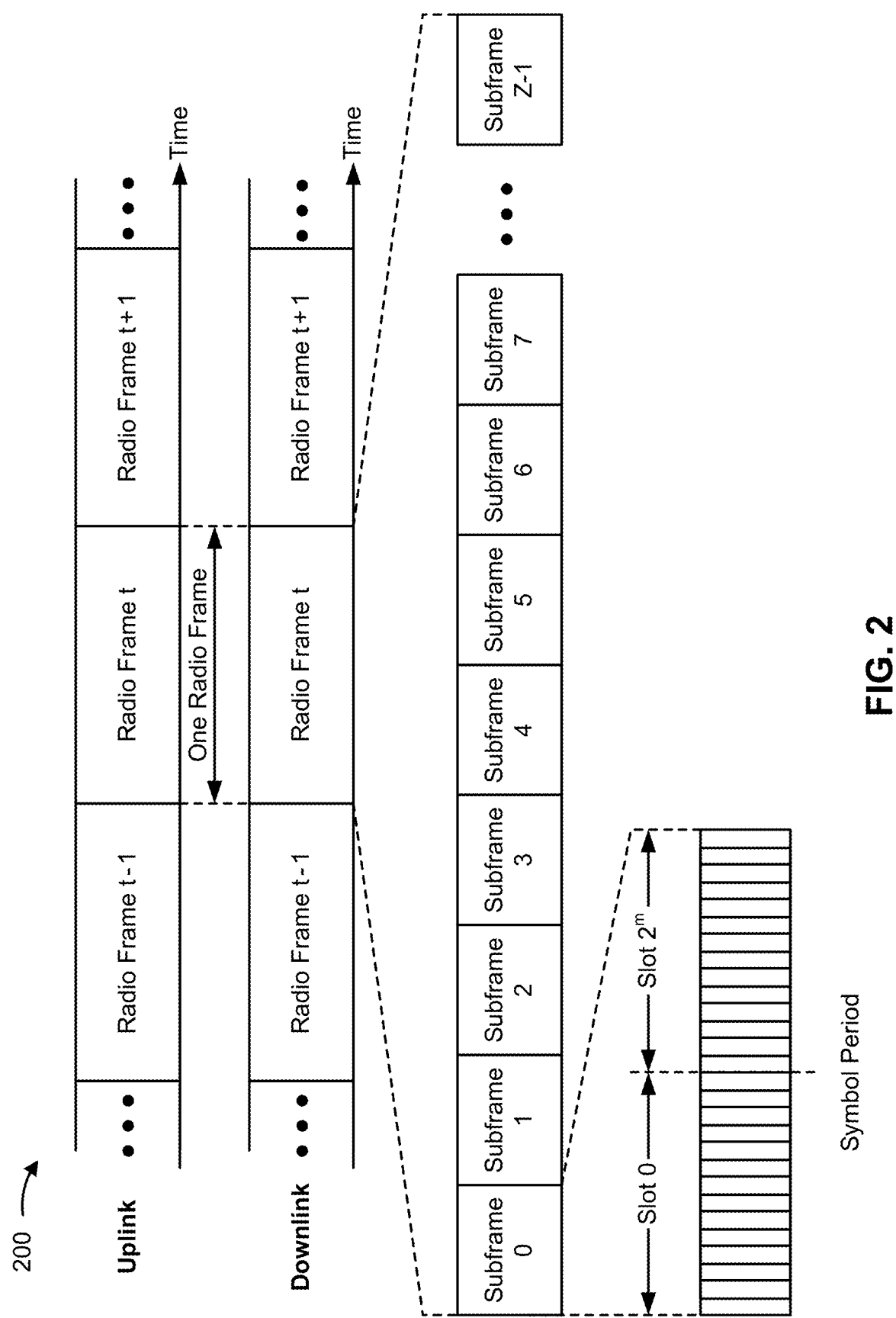
FIG. 2 shows an example frame structure in a telecommunications system in accordance with aspects of the present disclosure.

FIG. 2 shows an example frame structure 200 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2 m slots per subframe are shown in FIG. 2, where m is a numerology used for a transmission, such as 0, 1, 2, 3, 4, and/or the like). Each slot may include a set of L symbol periods. For example, each slot may include fourteen symbol periods, seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 2 may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs, including contention-based access such as an LBT-based access.

As indicated above, FIG. 2 is provided merely as an example. Other examples may differ from what was described herein but are still within the spirit with regard to FIG. 2.

Figure 3:
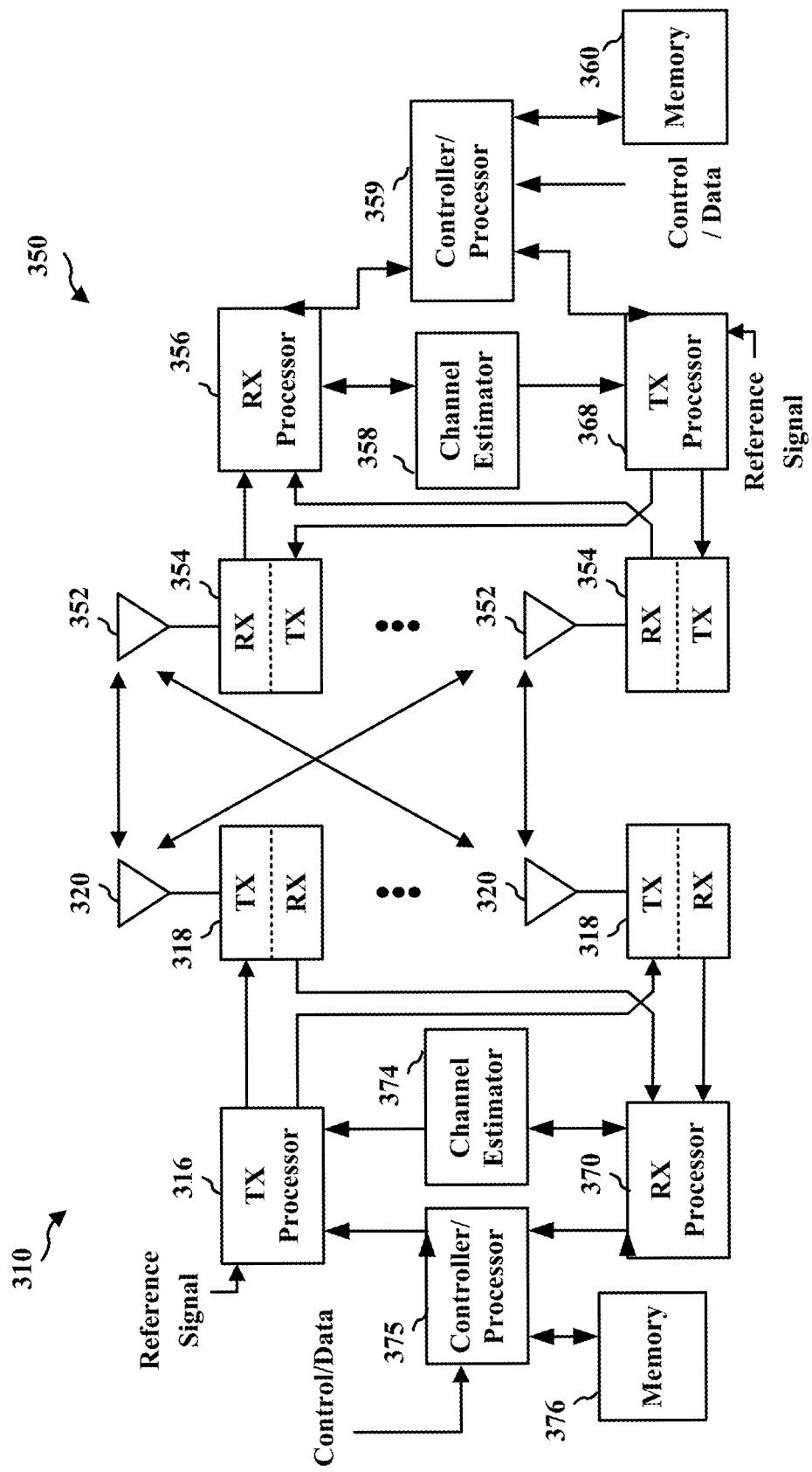
FIG. 3 is a diagram illustrating an example of a base station and user equipment (UE) in an access network in accordance with aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

As indicated above, FIG. 3 is provided merely as an example. Other examples may differ from what was described herein but are still within the spirit with regard to FIG. 4.

Figure 4:
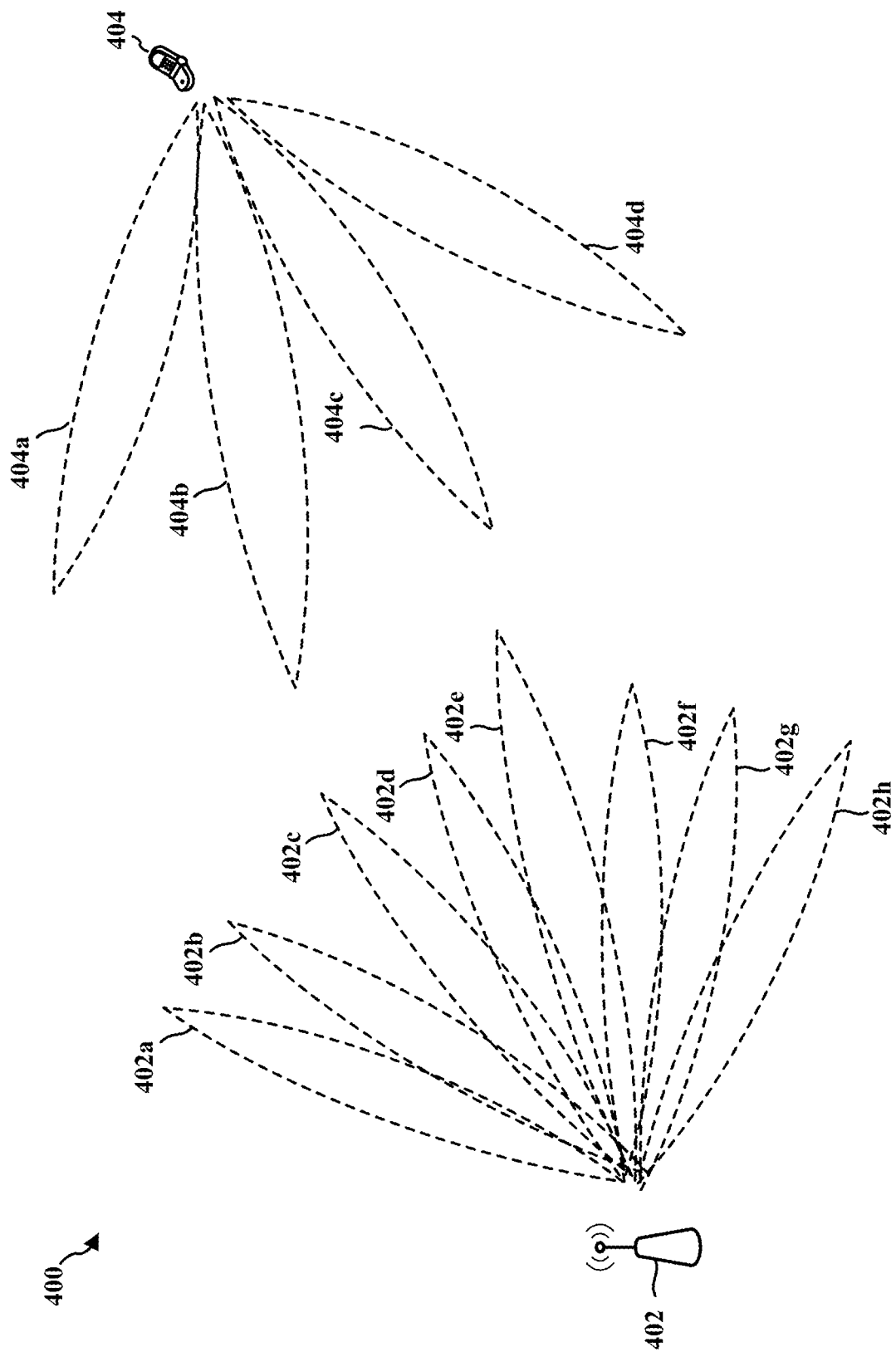
FIG. 4 is a diagram illustrating a base station in communication with a UE via directional beams in accordance with aspects of the present disclosure.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

FIG. 4 is provided merely as an example. In one alternative aspect, the UE 404 may be a peer 5G base station that is located within the transmission range of the base station 402. The peer base station may transmit signals to the base station 402 so that the base station 402 may select one from a plurality of Rx beams from the peer base station as a sensing beam for a set of transmission beams at the base station 402.

Figure 5:
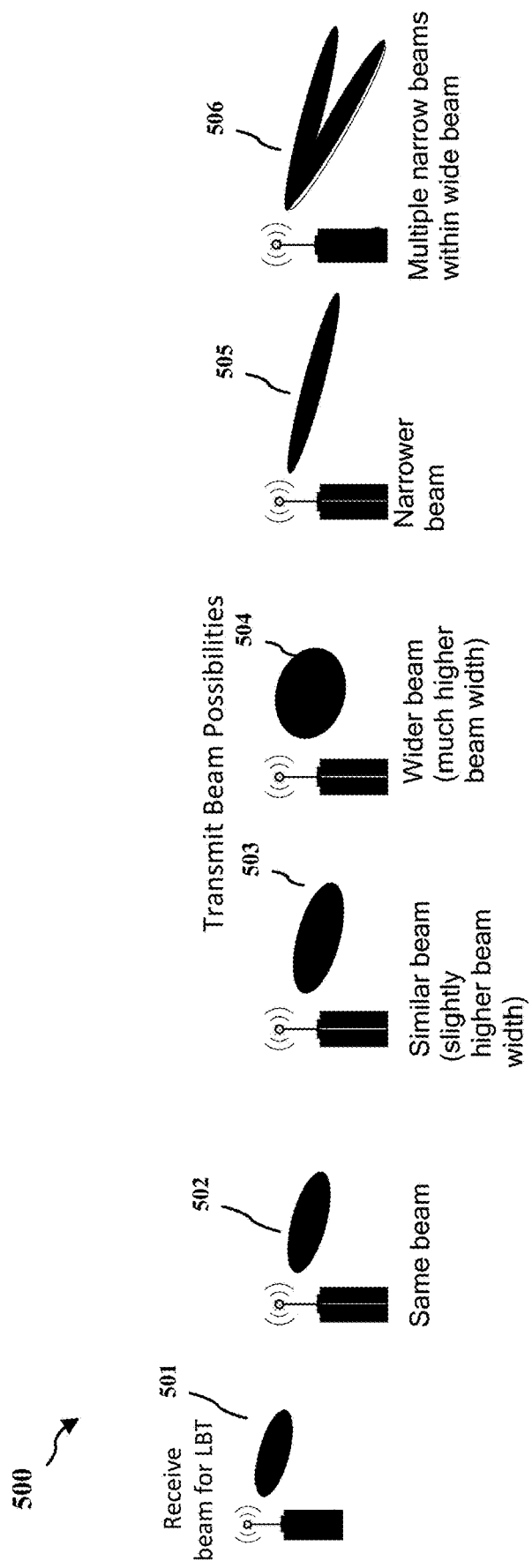
FIG. 5 illustrates an example sensing beam and a set of transmission beams in accordance with aspects of the present disclosure.
Figure 8:
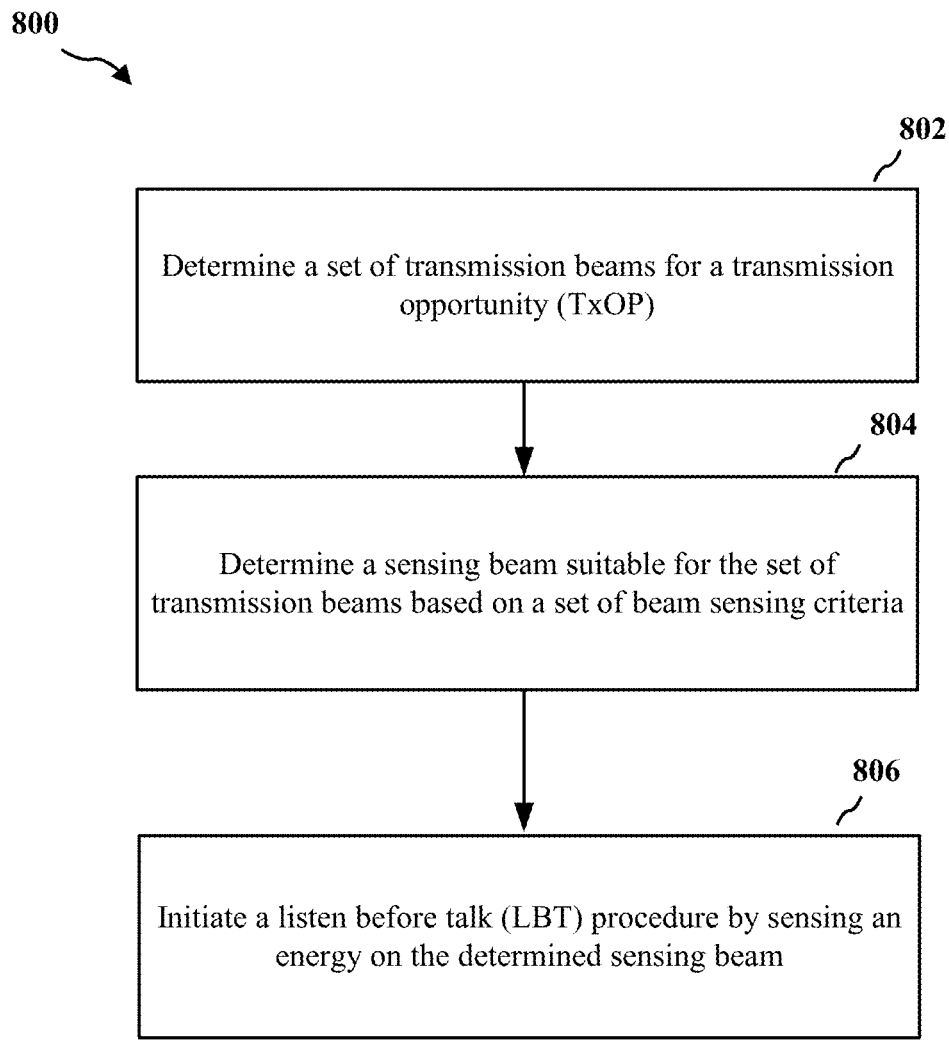
FIG. 8 is a flowchart of a method of wireless communication in accordance with various aspects of the present disclosure.

FIG. 5 illustrates an example directional beam set 500 at a wireless communication device in accordance with aspects of the present disclosure. The beam set 500 includes a receive (Rx) beam 501 and a set of transmission (Tx) beams 502-506. In one example aspect, the present disclosure proposes a concept of using a Rx beam as a proxy of a set of Tx beam for the purpose of determining a sensing beam for the Tx beam for an LBT procedure. While the Rx beam 501 may have one beam shape, the Tx beam set may include beam shapes that may be quite different from each other and from that of the Rx beam. For example, the Tx beams 502 and 503 may have the same or similar beam width as that of the Rx beam 501. On the other hand, other Tx beams of the Tx beam set may have beam widths that are different from that of the Rx beam 501. For example, Tx beams 504 and 505 may have a much wider or narrower beam width than that of the Rx beam 501 respectively and Tx beam 506 may have multiple narrow beams within a wide beam. In one example aspect, FIG. 5 illustrates the challenge of using one Rx beam as a proxy of the multiple Tx beams that may be quite different from the Rx beam at least in term of beam widths. FIG. 8 later will describe in details how the present disclosure may address the challenge.

Figure 6:
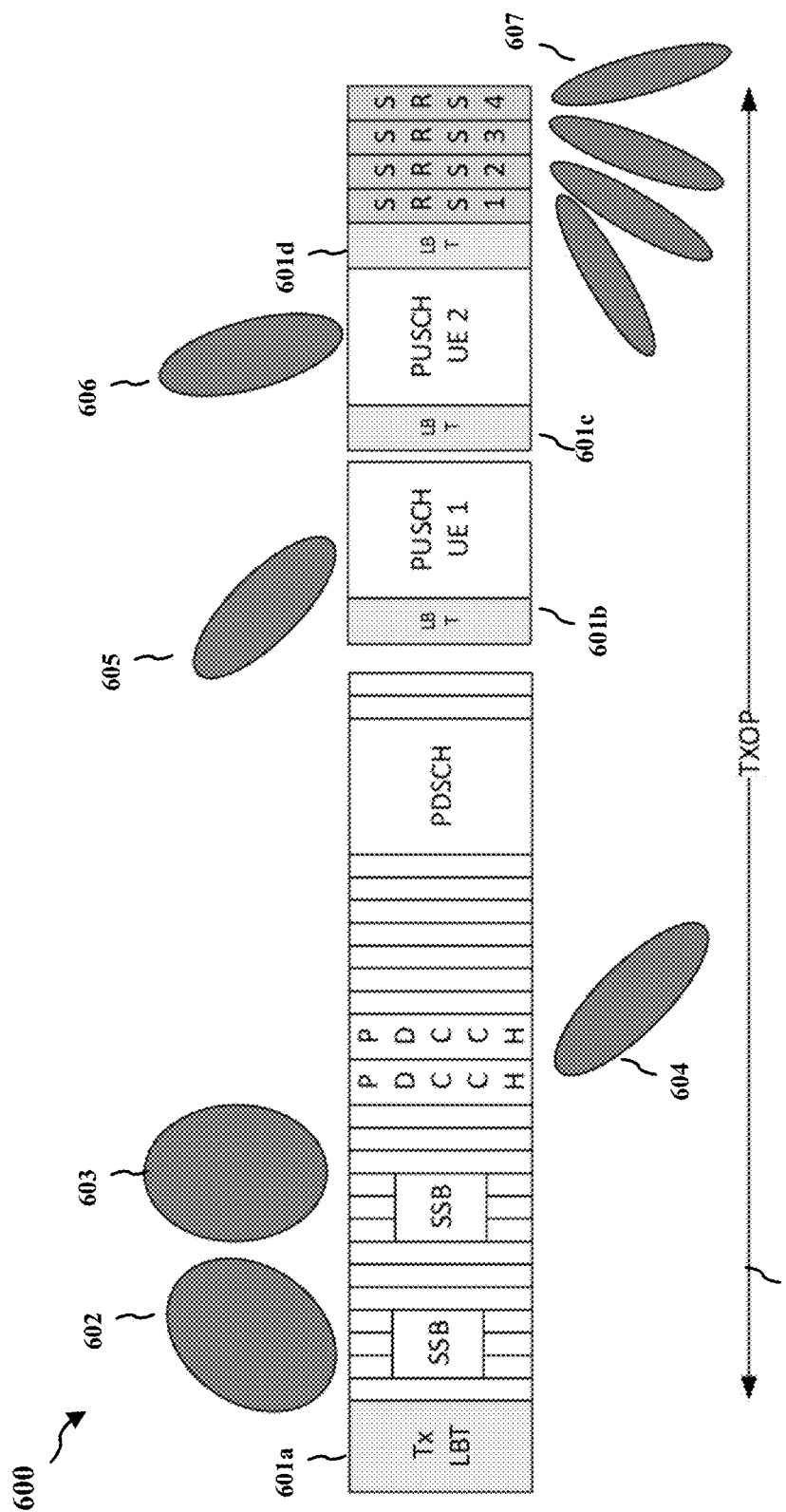
FIG. 6 illustrates an example set of transmission beams at a wireless communication device in accordance with aspects of the present disclosure.

FIG. 6 illustrates an example transmission beam set 600 within a transmission opportunity (TxOP) 610 in accordance with aspects of the present disclosure. The Tx beam set 600 may be used for a shared spectrum and as such, the LBT procedures 601a through 601d are used for transmission using Tx beams of different beam shapes. In one example aspect, downlink and uplink transmissions within the same TxOP 610 are in a Time Division Multiplex (TDM) fashion.

In one example aspect, the transmission beam set 600 illustrates an example of the need for different Tx beam widths and shapes to accommodate different channel types and data. For example, for a synchronization signal block (SSB) which is broadcast to the entire cell, wide transmission beams 602 and 603 are used. For another example, for a signaling channel PDCCH which may be sent to a single UE or group of UEs, a beam 604 narrower than the SSB beam 602 and 603 may be the choice. In another example aspect, data channel PUSCH and sounding reference signals SRS1 through SRS4, which are transmitted to specific UEs, may use beams 605, 606, and 607 with beam widths narrower than that of beam 604. A narrower TX beam may have a better transmission range or quality to a particular UE than a wider beam, given everything else being equal.

Figure 7:
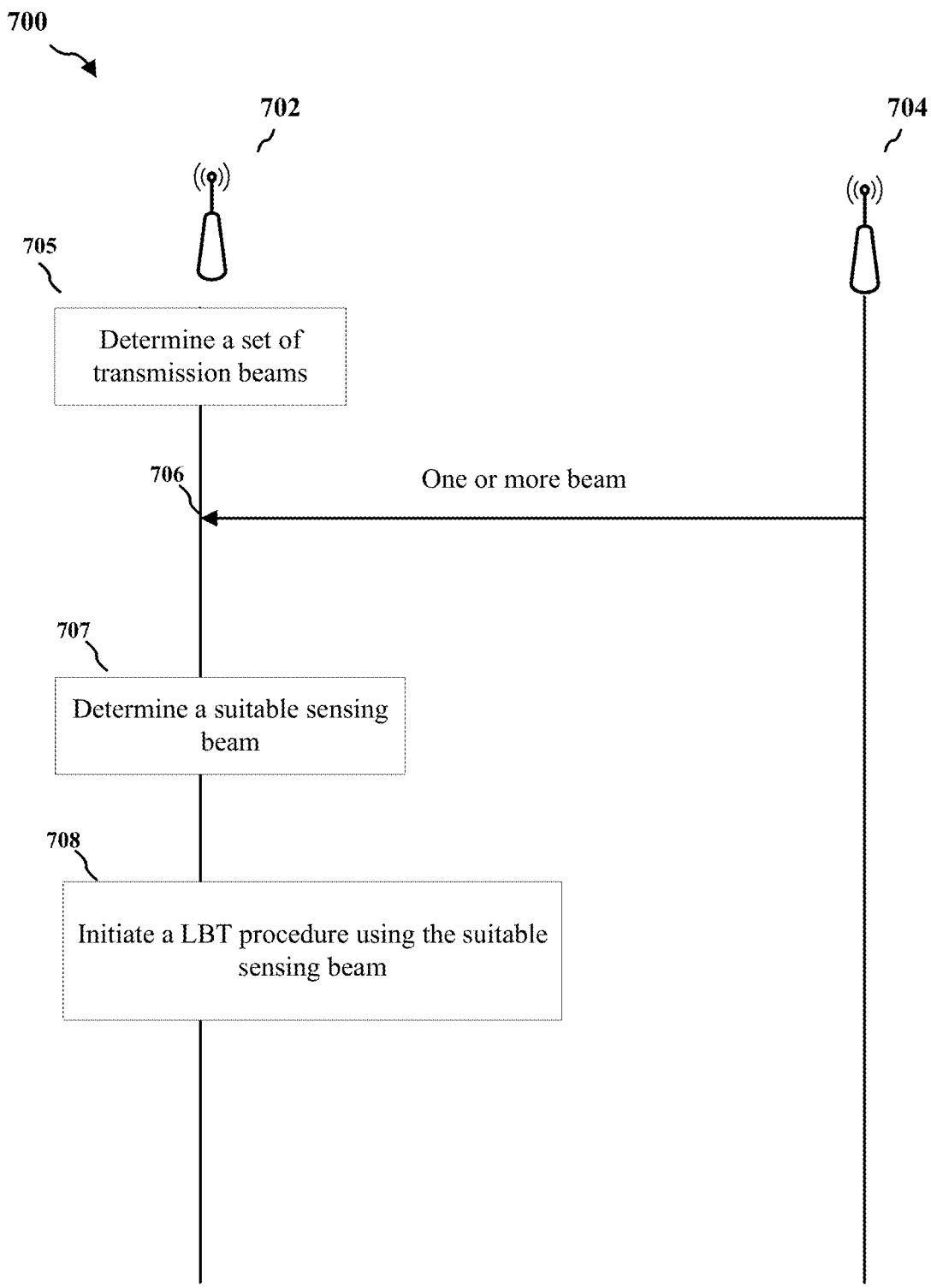
FIG. 7 is a diagram illustrating example message flow between two communication devices, in accordance with aspects of the present disclosure.

FIG. 7 is a diagram illustrating example message flow 700 between two wireless communication devices or nodes, in accordance with aspects of the present disclosure. The message flow 700 illustrates an example message exchange for determining a suitable sensing beam for an LBT procedure to gain access to a set of transmission beams on an unlicensed high-frequency band. As indicated earlier, a wireless communication device may be a 5G base station, a UE with a large number of antenna elements, a micro base station, etc. For the convenience of reference, it is assumed the wireless communication devices 702 and 704 are two 5G base stations. A dotted line indicates the associated step may be optional.

At block 705, the base station 702 may determine a set of transmission beams to use for communications with a set of 5G UEs within the cell. As indicated in FIG. 6 and described therein, determining the transmission beams may include determining each of the transmission beams based on information such as a channel type, data contents to be transmitted, and others. For example, for broadcast channel such as synchronization signal block (SSB), a wider transmission beam may be appropriate. For a UE-specific signal, such as an SRS or CSI-RS or PDCCH/PDSCH/PUSCH, a narrower, more focused beam may be appropriate. There may be other factors to be considered for determining the set of transmission beams, such as configuration of antenna elements, status of digital chains, MU-MIMO usage, etc.

At block 706, the base station 702 may receive one or more beams from the peer device 704. Although one Rx beam is indicated at step 706, more Rx beams may be received by the base station 702 on a continuing basis or on demand.

At block 708, the base station 702 may determine a suitable sensing beam for the set of transmission beams in an LBT procedure. In one aspect, determining a suitable sensing beam is finding a Rx beam based on a set of criteria such that the Rx beam may function as a proxy for the set of transmission beam. Details of the criteria for finding a suitable Rx beam as the sensing beam are discussed later, as related to FIG. 8.

At block 709, the base station 702, upon determining the suitable sensing beam, the base station may initiate an LBT procedure by checking the suitable sensing beam to determine whether the base station 702 may transmit on the determined set of transmission beams. If the result of checking the sensing beam is positive (no other node is transmitting on the set of transmission beams), the base station 702 may send a request to send (RTS) signaling to the receiving entity and then upon receiving a clear to send (CTS), the base station may start transmitting data on the set of transmission beams.

Closely related to the LBT procedure is a clear channel assessment procedure (CCA) that determines whether a transmission medium such as a channel or beam is available for transmission. As the word implies, this is a to figure out the channel or transmission medium is clear (i.e., nobody is using it). As part of the CCA procedure, the device perform energy detection for a certain period of time and make a decision whether the channel is clear or not. It is a common method being used in wireless technology such as 802.11 (WLAN) technology.

As indicated above, FIG. 7 is provided merely as an example. In an alternative example, the base station may already have a sensing beam configured, and may determine a set of transmission beams suitable for the sensing beam for an LBT procedure. This alternative example and other examples may have different message flow sequences and may differ from what is described herein but are still within the spirit of the present disclosure.

FIG. 8 is a flowchart of a method 800 of wireless communication, in accordance with various aspects of the present disclosure. The method 800 implements a process for a network node to determine a suitable sensing Rx beam for a set of Tx beams for an LBT procedure. The method 800 may be performed by a 5G base station, such as the base station 702 of FIG. 7 or the base station 180 of FIG. 1 or any of UEs 104 that has a large number of antenna elements. The optional steps are indicated in dotted lines.

At 802, the method 800 includes determining a set of Tx beams to be used for communications with a set of 5G UEs within the cell or with a peer network device/note. As indicated in FIG. 6 and described therein, determining the transmission beams may include determining each of the Tx transmission beams based on a channel type, transmission content, and other information. For example, for broadcast channel such as synchronization signal block, a wider transmission beam may be appropriate. For a UE-specific signal, such as a SRS, a narrower, more focused beam may be appropriate. There may be other factors to determining the set of Tx beams, such as configuration of antenna elements, status of digital chains, MU-MIMO usage, etc.

In one example aspect, the set of transmission beams may be preconfigured for common channels regularly used in normal operations and the task is to find a suitable Rx beam as the sensing beam for the LBT procedure on a shared spectrum. In this case, the determining of the set of Tx beams is simply selecting the preconfigured set of Tx beams.

At block 804, the method 800 includes determining a suitable sensing Rx beam for the set of Tx beams. The base station may determine a suitable sensing beam for the set of transmission beams in an LBT procedure. As indicated earlier, a sensing beam is a beam that the transmitting entity/node uses to sense whether the shared transmission medium is busy (being used by someone else). In a general case, the sensing medium is same as the transmission medium. For example, for access to a shared Wi-Fi channel, an access point may sense the shared channel to determine whether it can transmit on the same shared channel. However, for mmW communications, where directional beams are the transmission medium, it may not be efficient or practical to have the sensing beam be the same as the transmission beam.

Accordingly, in one aspect, determining a suitable sensing beam is finding a Rx beam based on a set of criteria so that the Rx beam may function as a proxy for the set of transmission beam. In one example aspect, the criteria includes at least the following condition: the energy of the sensing beam is equal or greater than a product of a weight factor and the energy of each of the set of the transmission beams. The condition may be expressed as Energy($B_0$)≥$\alpha_1$ Energy($B_1$) and Energy($B_0$)≥$\alpha_2$ Energy($B_2$) . . . and Energy($B_0$)≥$\alpha_n$ Energy($B_n$) and Energy($B_0$)≤threshold.

where $B_0$ is the candidate sensing beam, and $B_1 \ldots B_n$ are the member beams in the Tx beam set, the weight factor $\alpha_i$ is a value between 0 and 1, and the threshold is a predefined threshold. The predefined threshold is used in part to filter out outlying cases.

One rational behind the above criteria is that the Rx sensing beam may function as a proxy for all the member beams of the Tx beam set when performing beam energy detection in beam sensing for an LBT procedure if the above condition is met.

In one example aspect, the weight factor $\alpha_i$ in the above criteria is a function of a difference between the peak gain of the sensing beam and that of the $i^{th}$ transmission beam of the Tx beam set. In one example aspect, the peak gain may include both a corresponding antenna element gain and corresponding antenna array gain. In another example aspect, the weight factor $\alpha_i$ may take into account whether the transmission beam $B_i$ is an end-fire beam which is off the boresight of an associated antenna array. The weight factor $\alpha_i$ may take a more conservative value if the transmission beam $B_i$ is end-fire beam off the boresight of an associated antenna array. This may account for the fact that such a Tx beam may generate less interference to other beams.

In one example aspect, the base station may compare each beam of the Tx beam set with the candidate sensing beam to determine if the above criteria is met. The base station may repeat the pair-wise comparison for all members of the Tx beam set. If all members of the Tx beam set met the criteria, the candidate sensing beam is the suitable sensing beam for the Tx beam set for the LBT procedure. In one example aspect, the sensing beam criteria may further include a condition that the energy of each of the set of the transmission beams has an overall energy above a predetermined threshold. This condition may be useful in filtering out some outlying Tx beams that may not be a suitable member of the Tx beam set.

In some example aspect, Rx beams and Tx beams are mismatched. That is, the sensing beam may not overlap with any transmission beam of the transmission beam set and the width of the sensing beam may be different than that of each transmission beam of the transmission beam set. This may expand the pool for the suitable sensing beam, and account for the relatively common cases of a Rx beam not overlapping with a Tx beam.

In another example aspect, each transmission beam of the Tx beam set may have one or more peak directions, depending on how the beam is generated. For example, 506 of the FIG. 5 has two peak directions. This may further expand the pool for a potentially suitable sensing beam.

While the above criteria may account for majority of cases, there may be some uncommon cases where the above criteria may not work well. For example, when the potential sensing beam partially overlaps with the transmission beam $B_i$, and/or partially located on the side lobe of the transmission beam $B_i$, the above criteria may not work well, in part because the potential sensing beam may interfere with part of the transmission beam $B_i$. In this case, the above sensing criteria may be revised to include the following condition that the probability that the energy of the sensing beam is equal or greater than the product of a weight factor and the energy of the transmission beam $B_i$ is equal to or greater than a predetermined probability value.

The revised sensing criteria may be expressed as:

$$P[\text{Energy}(B_0) \geq \alpha_1 \text{ Energy}(B_1) \text{ and Energy}(B_0) \geq \alpha_2 \text{ Energy}(B_2) \ldots \text{ and Energy}(B_0) \geq \alpha_n \text{ Energy}(B_n)] \geq \beta.$$

While P is the probability that the energy of the sensing beam is equal or greater than the product of a weight factor and the energy of the transmission beam $B_i$, $\beta$ is the predetermined probability value. The value of $\beta$ may be determined based on experiments or simulations. In addition, the set of beam directions used for comparison may be limited to the directions in which either of the beams transmit a significant amount of energy that is above a predefined threshold. For example, it is observed that $\beta \in [0.05, 0.1]$ is a reasonable fit, based on simulation results.

At block 806, the method 800 including initiating an LBT procedure using the determined suitable sensing beam. Upon determining the suitable sensing beam, the base station may initiate an LBT procedure by checking the suitable sensing beam to determine whether the base station 702 may transmit information using the set of transmission beams. If the result of checking the sensing beam is positive (no other node is transmitting on the set of transmission beam), the base station 702 may send a request to send (RTS) signaling to the receiving entity and then upon receiving a clear to send (CTS), the base station may start transmitting data using the set of transmission beam.

The method 800 is for illustration purpose and shows one possible process for a network node to determine a sensing beam for a set of transmission beams for an LBT procedure on a shared high-frequency band. In practice, one or more steps shown in the illustrative flowchart for the method 800 may be combined with other steps, performed in any suitable order, performed in parallel (e.g., simultaneously or substantially simultaneously), or removed.

Figure 9:
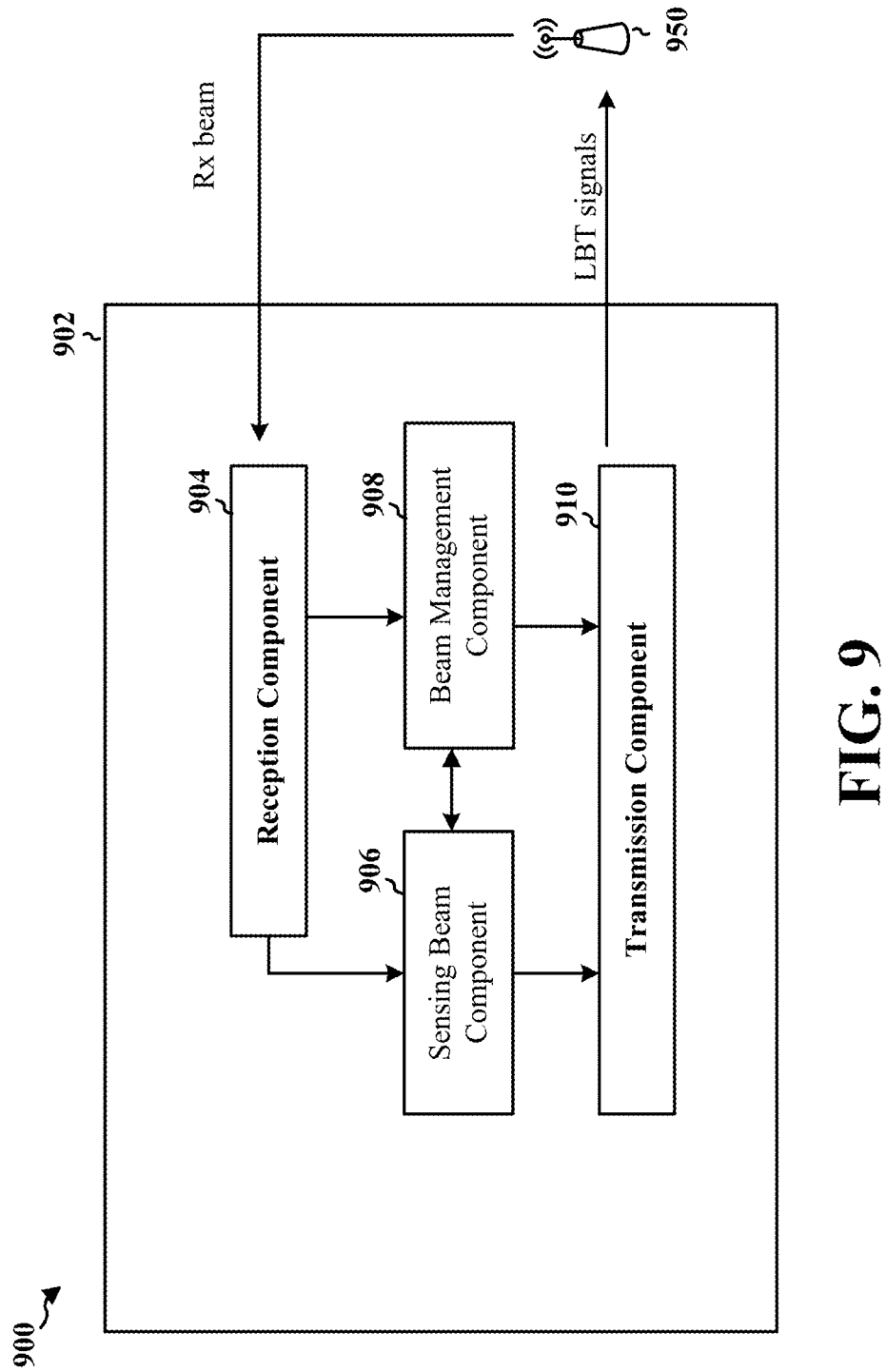
FIG. 9 is a conceptual data flow diagram illustrating the data flow between different means/components in an exemplary apparatus in accordance with aspects of the present disclosure.

FIG. 9 is a conceptual data flow diagram 900 illustrating the data flow between different means/components in an exemplary apparatus 902. The apparatus may be a 5G base station or a UE with a large number of antenna elements. The apparatus includes a reception component 904 that may receive a sensing beam from a peer network device or node, a sensing beam component 906 that may be configured to determine a sensing beam for a set of transmission beams, a beam management component 908 that may be configured to manage the set of transmission beams and initiate a LBT procedure, and a transmission component 910 that is configured to transmit LBT related signals and data to the peer 5G base station 950.

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
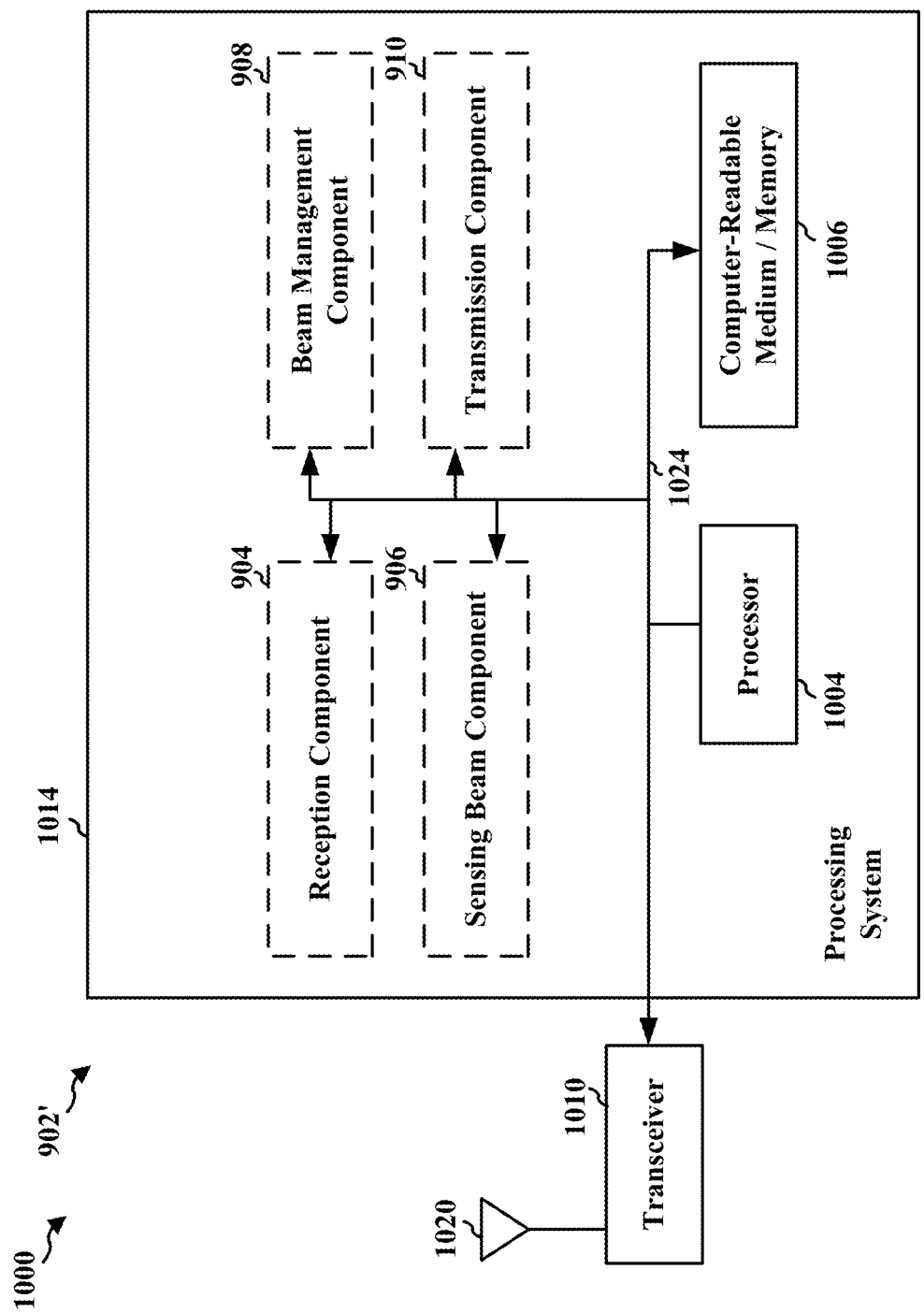
FIG. 10 is a diagram illustrating an example of a hardware implementation for an apparatus employing a processing system in accordance with aspects of the present disclosure.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, and 908 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 919, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, and 908. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for determining set of transmission beams for a transmission opportunity, and means for determining a sensing beam for the set of transmission beams based on a set of beam sensing criteria, means for receiving a confirmation from the gNB, and means for initiating a listen before talk (LBT) procedure by sensing an energy on the determined sensing beam. The aforementioned means may be one or more of the aforementioned components of the apparatus 1002 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a wireless communication device, comprising:
   determining a set of transmission beams for a transmission opportunity (TxOP), the set including a plurality of transmission beams;
   determining a receive (Rx) sensing beam to operate as a proxy for the set of transmission beams based on one or more beam sensing criteria associated with an energy of the sensing beam being equal to or greater than a weighted energy of each of the set of transmission beams; and
   initiating a listen before talk (LBT) procedure by sensing the energy on the sensing beam.

2. The method of claim 1, wherein the one or more beam sensing criteria comprise the energy of the sensing beam being equal to or greater than a product of a weight factor and an energy of each of the set of transmission beams.

3. The method of claim 1, wherein the one or more sensing criteria comprise a probability of the energy of the sensing beam being equal to or greater than a product of a weight factor and an energy of each of the set of the transmission beams is equal to or greater than a predetermined probability value.

4. The method of claim 3, wherein determining the sensing beam for the set of transmission beams further comprises comparing the sensing beam with each of the set of the transmission beams based on the one or more sensing criteria, and wherein a set of beam directions used for the comparing are limited to those directions in which either of the sensing beam or the transmission beam has a transmission energy above a predefined threshold.

5. The method of claim 2, wherein the one or more sensing criteria comprise the energy of the sensing beam being equal to or greater than the product of the weight factor and the energy of each of the set of transmission beams, the energy being above a predetermined threshold.

6. The method of claim 2, wherein the energy of the sensing beam is less than or equal to another predetermined threshold.

7. The method of claim 2, wherein the weight factor is a function of a difference of a peak gain between the sensing beam and each of the set of transmission beams, wherein the peak gain comprises at least an antenna element gain and an antenna array gain.

8. The method of claim 2, wherein the weight factor is a function of whether each of the set of transmission beams is an end-fire beam which is off a boresight of an associated antenna array.

9. The method of claim 1, wherein the sensing beam does not overlap with any of the set of transmission beams.

10. The method of claim 1, wherein the sensing beam comprises a receive beam received from a peer device of the wireless communication device.

11. The method of claim 1, wherein each of the set of transmission beams has one or multiple peak directions, depending how the beam is generated.

12. The method of claim 1, wherein a width of the sensing beam is different than that of each of the set of transmission beams.

13. The method of claim 1, wherein the wireless communication device comprise one of a new radio (NR) base station, a user equipment with a large number of antenna elements, and a micro base station.

14. An apparatus for wireless communications implemented at a wireless communication device, comprising
a transceiver;
a memory; and
at least one processor coupled to the memory and configured to
determine a set of transmission beams for a transmission opportunity (TxOP), the set including a plurality of transmission beams; and
determine a receive (Rx) sensing beam for the set of transmission beams based on one or more beam sensing criteria associated with an energy of the sensing beam being equal to or greater than a weighted energy of each of the set of transmission beams; and
initiate a listen before talk (LBT) procedure by sensing the energy on the sensing beam.

15. The apparatus of claim 14, wherein the one or more beam sensing criteria comprises the energy of the sensing beam being equal to or greater than a product of a weight factor and an energy of each of the set of transmission beams.

16. The apparatus of claim 14, wherein the one or more sensing criteria comprises a probability of the energy of the sensing beam being equal to or greater than a product of a weight factor and an energy of each of the set of transmission beams is equal to or greater than a predetermined probability value.

17. The apparatus of claim 16, wherein to determine the sensing beam for the set of transmission beams further comprises comparing the sensing beam with each of the set of transmission beams based on the sensing criteria, and wherein a set of beam directions used for the comparing are limited to those directions in which either of the sensing beam or each of the set of transmission beams has a transmission energy above a predefined threshold.

18. The apparatus of claim 16, wherein the one or more sensing criteria comprise the energy of the sensing beam being equal to or greater than a product of a weight factor and an energy of each of the set of transmission beams that has an overall energy above a predetermined threshold.

19. The apparatus of claim 15, wherein the energy of the sensing beam is less or equal to a predetermined threshold.

20. The apparatus of claim 15, wherein the weight factor is a function of a difference of a peak gain between the sensing beam and each of the set of transmission beams, wherein the peak gain comprises at least both an antenna element gain and antenna array gain.

21. The apparatus of claim 15, wherein the weight factor is a function of whether each of the set of transmission beams is an end-fire beam which is off boresight of an associated antenna array.

22. The apparatus of claim 15, wherein the sensing beam does not overlap with any of the set of transmission beams.

23. The apparatus of claim 15, wherein the sensing beam is a receive beam received from a peer device of the wireless communication device.

24. The apparatus of claim 15, wherein each of the set of transmission beams has one or multiple peak directions, depending how the beam is generated.

25. The apparatus of claim 24, wherein a width of the sensing beam is different than that of the transmission beam.

26. The apparatus of claim 14, wherein the wireless communication device comprise one of a new radio (NR) base station, a user equipment with a large number of antenna elements, and a micro base station.

27. An apparatus for wireless communication, comprising:
means for determining a set of transmission beams for a transmission opportunity (TxOP), the set including a plurality of transmission beams; and
means for determining a receive (Rx) sensing beam for the set of transmission beams based on one or more beam sensing criteria associated with an energy of the sensing beam being equal to or greater than a weighted energy of each of the set of transmission beams; and
means for initiating a listen before talk (LBT) procedure by sensing the energy on the sensing beam.

28. The apparatus of claim 27, wherein the one or more beam sensing criteria comprises the energy of the sensing beam being equal to or greater than a product of a weight factor and an energy of each of the set of transmission beams.

29. A non-transitory computer-readable medium storing computer executable code, comprising code to:
determine a set of transmission beams for a transmission opportunity (TxOP), the set including a plurality of transmission beams; and
determine a receive (Rx) sensing beam for the set of transmission beams based on one or more beam sensing criteria associated with an energy of the sensing beam being equal to or greater than a weighted energy of each of the set of transmission beams; and
initiate a listen before talk (LBT) procedure by sensing the energy on the sensing beam.

30. The computer-readable medium of claim 29, wherein the one or more sensing criteria comprises a probability of the energy of the sensing beam being equal to or greater than a product of a weight factor and an energy of each of the set of transmission beams is equal to or greater than a predetermined probability value.

* * * * *